US 8,925,583 B2

(12) United States Patent
Zhou et al.

(10) Patent No.: US 8,925,583 B2
(45) Date of Patent: Jan. 6, 2015

(54) FLOW ADJUSTABLE WATERWAY SWITCH DEVICE

(75) Inventors: Huasong Zhou, Xiamen (CN);
Shuiyuan Luo, Xiamen (CN);
Zhongcheng Jin, Fujian (CN); Jianmin Chen, Xiamen (CN)

(73) Assignees: Xiamen Solex High-Tech Industries Co., Ltd., Xiamen (CN); Huasong Zhou, Xiamen (CN)

( * ) Notice: Subject to any disclaimer, the term of this patent is extended or adjusted under 35 U.S.C. 154(b) by 78 days.

(21) Appl. No.: 13/812,087

(22) PCT Filed: Aug. 22, 2011

(86) PCT No.: PCT/CN2011/078683
§ 371 (c)(1),
(2), (4) Date: Jan. 24, 2013

(87) PCT Pub. No.: WO2013/025033
PCT Pub. Date: Mar. 1, 2012

(65) Prior Publication Data
US 2013/0118620 A1  May 16, 2013

(30) Foreign Application Priority Data

Aug. 26, 2010 (CN) .......................... 2010 1 0266435
Aug. 26, 2010 (CN) ...................... 2010 2 0509061 U

(51) Int. Cl.
*F16K 47/08* (2006.01)
*F16K 11/02* (2006.01)
*B05B 1/16* (2006.01)
*B05B 1/18* (2006.01)
*F16K 11/074* (2006.01)
*F16K 31/524* (2006.01)

(52) U.S. Cl.
CPC ............... *F16K 11/02* (2013.01); *B05B 1/1636* (2013.01); *B05B 1/18* (2013.01); *F16K 11/074* (2013.01); *F16K 31/52483* (2013.01)
USPC ................ 137/625.3; 137/625.11; 137/636.4; 251/230

(58) Field of Classification Search
USPC ......... 137/625.3, 625.11, 614.11, 636.4, 597; 251/230
See application file for complete search history.

(56) References Cited

U.S. PATENT DOCUMENTS 1,792,906 A * 2/1931 Heilos ...................... 137/625.11
2,079,743 A * 5/1937 Krieger ...................... 210/532.1

(Continued)

FOREIGN PATENT DOCUMENTS

CN 101799084 A 8/2010
CN 101922570 A 12/2010

(Continued)

*Primary Examiner* — Stephen M Hepperle
*Assistant Examiner* — Umashankar Venkatesan
(74) *Attorney, Agent, or Firm* — Rabin & Berdo, P.C.

(57) ABSTRACT

A flow adjustable waterway switch device is disposed inside a valve body. The valve body is disposed with an inlet connected to the water source and at least two outlets. The waterway switch device has a driving shaft, a setting plate rotated and disposed inside the valve body and a button mechanism. One end of the driving shaft is disposed outside the valve body, and the other end is disposed inside the valve body. The setting plate is rotated by the driving shaft. The flow area of the inlet is changed by the relative rotation of the setting plate and the valve body to adjust the flow. The button mechanism includes a switch plate rotated and disposed inside the valve body, a switch rotor and a restoring spring, the driving shaft is rotated relatively to the switch rotor but not sliding relatively.

11 Claims, 10 Drawing Sheets

(56) References Cited

U.S. PATENT DOCUMENTS

| | | | |
|---|---|---|---|
| 2,391,126 A * | 12/1945 | Carter | 137/614.11 |
| 3,152,760 A * | 10/1964 | Bowman | 236/12.2 |
| 4,116,216 A * | 9/1978 | Rosenberg | 137/624.13 |
| 5,022,429 A * | 6/1991 | Rollini et al. | 137/218 |
| 5,316,042 A * | 5/1994 | Lim et al. | 137/625.11 |
| 5,624,073 A | 4/1997 | Mueller et al. | |
| 6,550,697 B2 * | 4/2003 | Lai | 239/446 |
| 6,845,917 B1 * | 1/2005 | Chen | 236/12.1 |
| 7,152,814 B1 | 12/2006 | Schapper et al. | |
| 7,303,151 B2 * | 12/2007 | Wu | 239/447 |
| 7,509,976 B2 * | 3/2009 | McNerney et al. | 137/625.11 |
| 8,695,638 B2 * | 4/2014 | DiNunzio | 137/636.3 |
| 2008/0156902 A1 * | 7/2008 | Luettgen et al. | 239/447 |
| 2010/0193721 A1 * | 8/2010 | Melle | 251/213 |

FOREIGN PATENT DOCUMENTS

| | | |
|---|---|---|
| CN | 201772107 U | 3/2011 |
| DE | 4118541 A1 | 12/1992 |
| DE | 202009010191 U1 | 12/2009 |

\* cited by examiner

FLOW ADJUSTABLE WATERWAY SWITCH DEVICE

FIELD OF THE INVENTION

The present invention relates to sanitary ware, especially to a flow adjustable waterway switch device.

BACKGROUND OF THE INVENTION

The existing flow adjustable waterway switch device is usually structural complex. The automatic ball point pen mechanism is practicable. However there is rare applicability with an automatic ball point pen mechanism in sanitary ware, such as a shower or a shower nozzle, there is rare product applied with the automatic ball point pen mechanism to the waterway switch. So sanitary ware product applied with the automatic ball point pen mechanism is very welcome, it makes the product with compact and simplified structure and complete functions.

SUMMARY OF THE INVENTION

The present invention is provided with a flow adjustable waterway switch device, which overcomes the technical problem of the existing technology.

One technical proposal of the present invention is as below:

A flow adjustable waterway switch device, which is disposed inside a valve body, the valve body is disposed with an inlet connected to the water source and at least two outlets:

The waterway switch device includes a driving shaft, a setting plate rotated and disposed inside the valve body and a button mechanism, one end of the driving shaft is disposed outside the valve body, the other end of the driving shaft is disposed inside the valve body;

The driving shaft is sliding and connected to the setting plate but not relatively rotated, the setting plate is driven to rotate by the rotating of the driving shaft, the flow area of the inlet is changed by the relative rotation of the setting plate and the valve body to adjust the flow;

The button mechanism includes a switch plate rotated and disposed inside the valve body, a switch rotor and a restoring spring, the driving shaft is rotated relatively to the switch rotor but not sliding relatively, the switch plate is driven to rotate forward by the repeatedly sliding of the switch rotor, the switch of the outlets to connect to the inlet is realized by the relatively rotating of the switch plate and the valve body.

In another preferred embodiment, the valve body further includes a water diversion body, the end face of the water diversion body is disposed with two water diversion holes separately corresponding to the outlets, the switch plate and the switch rotor are synchronously rotated relatively to the end face of the water diversion body.

In another preferred embodiment, the switch plate and the switch rotor are cooperated by the ratchet wheel and the ratchet.

In another preferred embodiment, the button mechanism further includes a control button, the control button is extended out of the valve body, the driving shaft is sleeved inside the restoring spring, the restoring spring is withstood between the control button and the water diversion body.

In another preferred embodiment, the setting plate is disposed with an assembly groove, one end of the driving shaft is fixed to the interior end face of the control button, the other end of the driving shaft is sliding and connected to the assembly groove inside.

In another preferred embodiment, the valve body is fixed with a baffle inside, the baffle is separated the cavity of the valve body into two cavities, the baffle is disposed at least one water hole.

In another preferred embodiment, the setting plate is rotated relatively to the baffle, the setting plate is disposed with a setting hole corresponding to the end face of the water hole.

The other technical proposal of the present invention is as below:

A flow adjustable waterway switch device, which is disposed inside a shower, the shower body is disposed with an inlet connected to the water source and at least two outlets:

The waterway switch device includes a driving shaft, a setting plate rotated and disposed inside the shower body and a button mechanism, one end of the driving shaft is disposed outside the valve body, the other end of the driving shaft is disposed inside the valve body;

The driving shaft is sliding and connected to the setting plate but not relatively rotated, the setting plate is driven to rotate by the rotating of the driving shaft, the flow area of the inlet is changed by the relative rotation of the setting plate and the shower body to adjust the flow;

The button mechanism includes a switch plate rotated and disposed inside the shower body, a switch rotor and a restoring spring, the driving shaft is rotated relatively to the switch rotor but not sliding relatively, the switch plate is driven to rotate forward by the repeatedly sliding of the switch rotor, the switch of the outlets to connect to the inlet is realized by the relative rotation of the switch plate and the shower body.

In another preferred embodiment, the shower body further includes a water diversion body, the end face of the water diversion body is disposed with two water diversion holes separately corresponding to the outlets, the switch plate and the switch rotor are synchronously rotated relatively to the end face of the water diversion body, the switch plate and the switch rotor are cooperated by the ratchet wheel and the ratchet.

In another preferred embodiment, the button mechanism further includes a control button, the control button is extended out of the shower body, the driving shaft is sleeved inside the restoring spring, the restoring spring is withstood between the control button and the water diversion body.

Compared to the existing technology, the present invention of a flow adjustable waterway switch device has advantages as below:

1. The flow adjustable waterway switch device is disposed inside a valve body or a shower body, the driving shaft drives the setting plate rotate to adjust the flow rate, with the cooperation of the driving shaft and the button mechanism, the outlets are switched, the structure is compact with complete functions.

2. The valve body or the shower body is fixed with a water diversion body inside, the end face of the water diversion body is disposed with at least two water diversion holes, the switch plate can rotate relatively to the end face of the water diversion body to control the outlets to switch outlet or synchronously outlet.

3. The switch plate and the switch rotor are cooperated by the ratchet wheel and the ratchet, making the two more steady and reliable.

4. The button mechanism further includes a control button, the user rotates or presses the control button to control the driving shaft move to adjust the flow rate or switch outlet.

5. One end of the driving shaft is fixed to the interior end face of the control button, the other end is sliding and connected to the setting plate, making each component cooperated compactly.
6. The valve body or the shower body is disposed with a baffle inside, the baffle is disposed with at least one water hole to connect the two cavities of the valve body or the shower body.
7. The setting plate is disposed with a setting hole, so when the setting plate rotates relatively to the baffle, the setting hole is cooperated to the end face of the water hole, the flow rate changes by changing the flow area of the water hole, the design is ingenious with high space usage.

BRIEF DESCRIPTION OF THE DRAWINGS

The present invention will be further described with the drawings and the embodiments.

REFERENCE MARK

Figure 1:
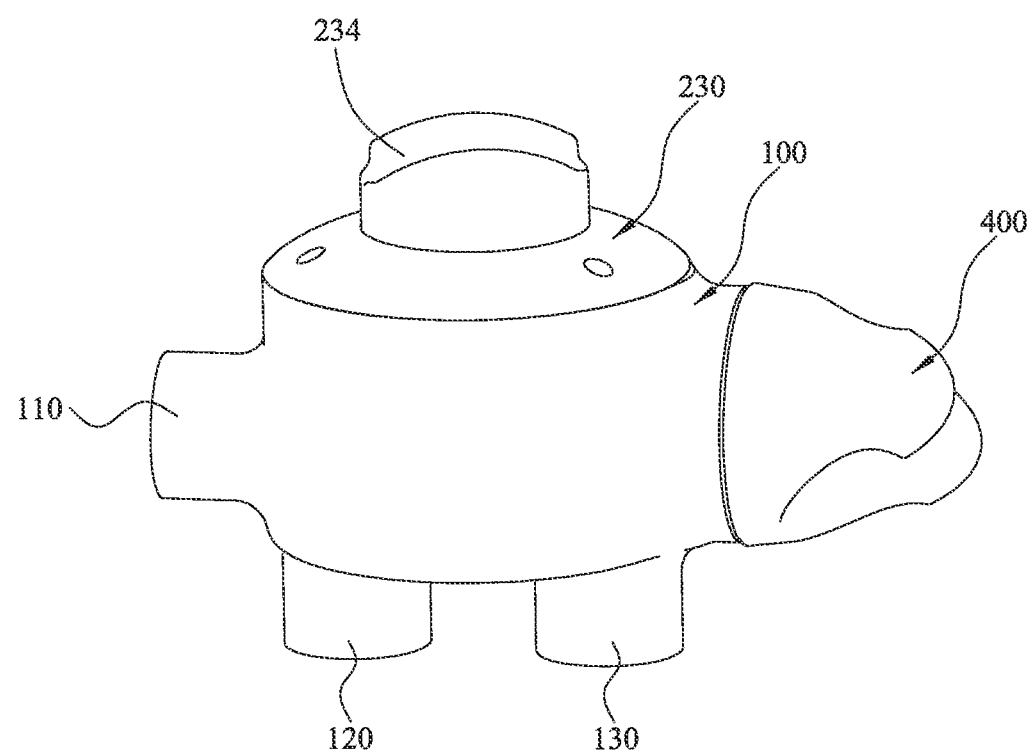
FIG. 1 illustrates the structure of the waterway switch device assembled with the valve body of the first embodiment.
Figure 2:
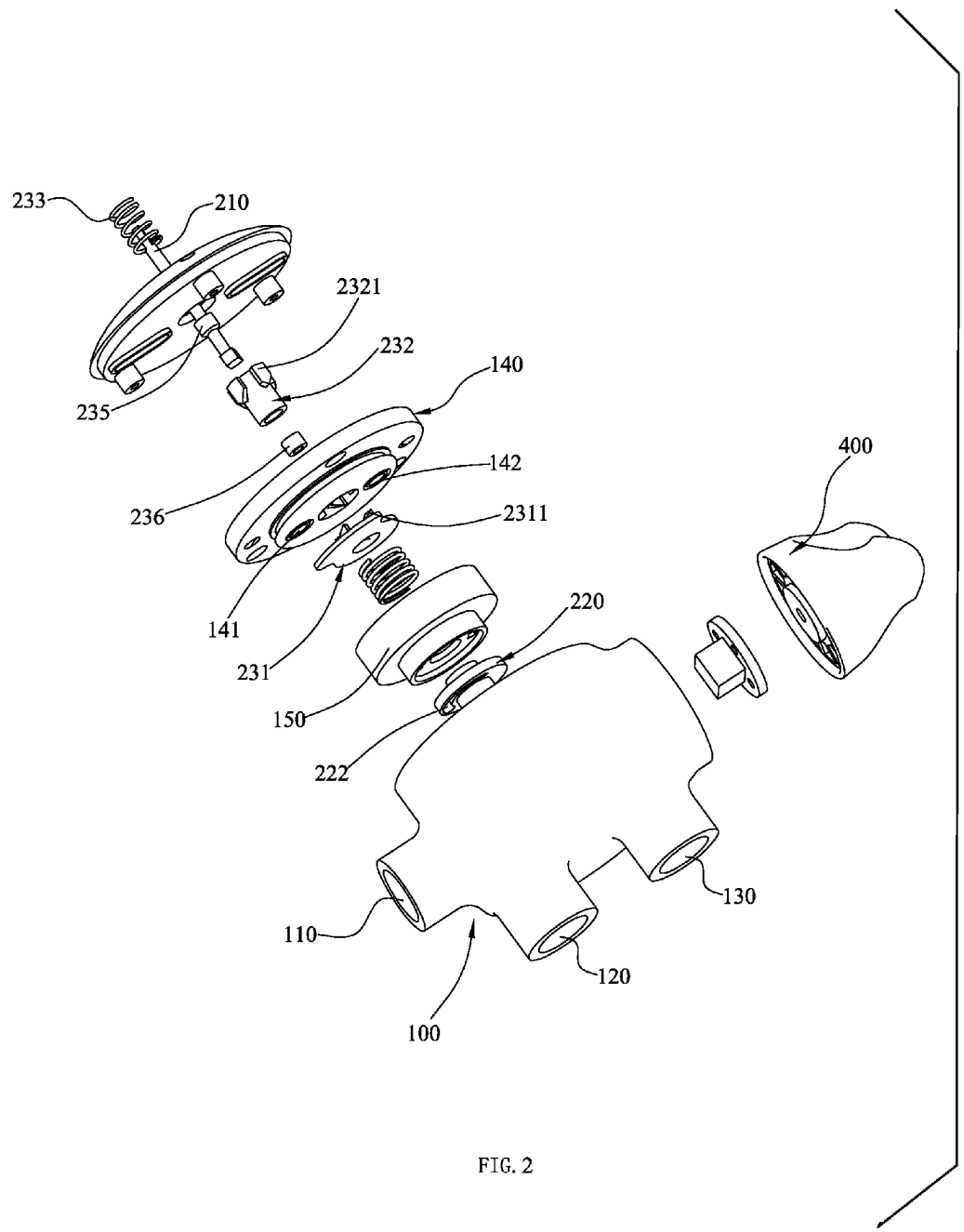
FIG. 2 illustrates the breakdown structure of the waterway switch device assembled with the valve body of the first embodiment.
Figure 3:
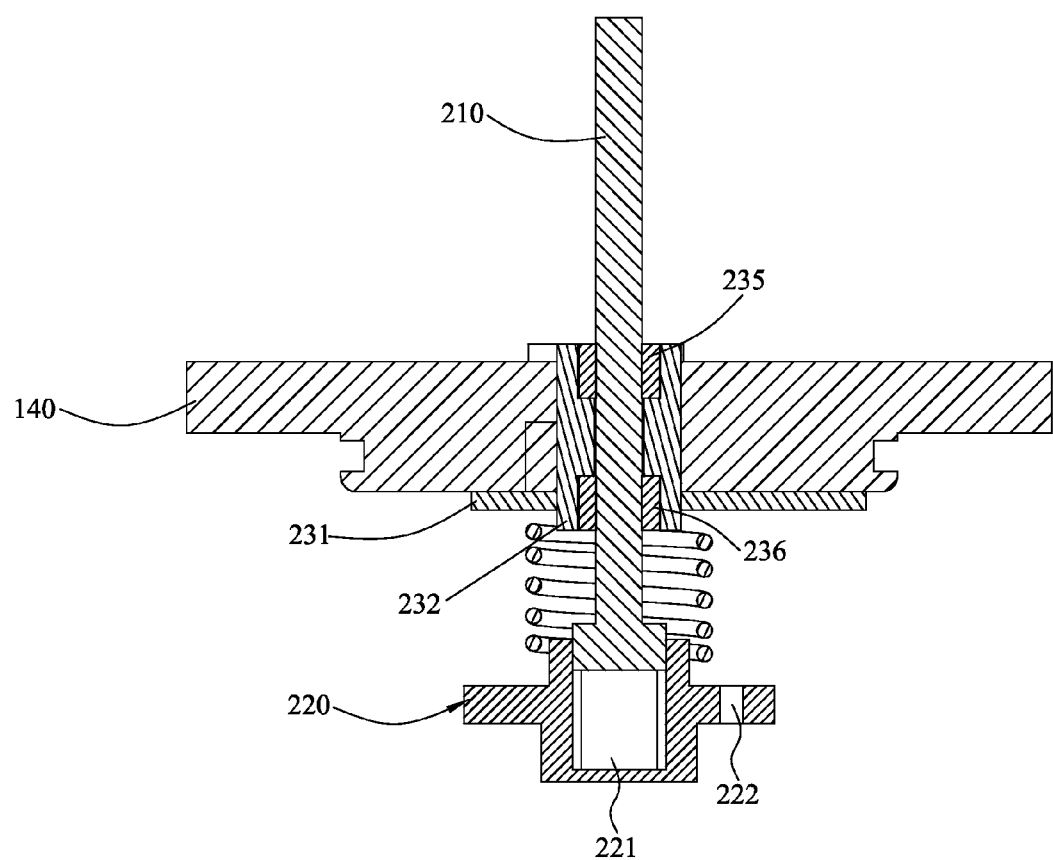
FIG. 3 illustrates the cross sectional view of the assembly of the driving shaft, the water diversion body, the switch plate, the switch rotor and the setting plate, when the switch plate is sealed up one of the water diversion holes of the first embodiment.

Valve body 100; inlet 110; inlet hole 111; the first outlet 120; the second outlet 130; the water diversion body 141; the first water diversion hole 141; the second water diversion hole 142; the baffle 150; the water hole 151, 152; the first cavity 160; the second cavity 170; the driving shaft 210; the setting plate 220; the assembly groove 221; the setting hole 222; the button mechanism 230; the switch plate 231; the ratchet wheel 2311; the switch rotor 232; the ratchet 2321; the restoring spring 233; the control button 234; the limiting sleeve 235, 236; the shower body 300; the inlet 310; the first outlet 320; the second outlet 330; the socket 400.

DETAILED DESCRIPTION OF THE EMBODIMENTS

The First Embodiment

Figure 8:
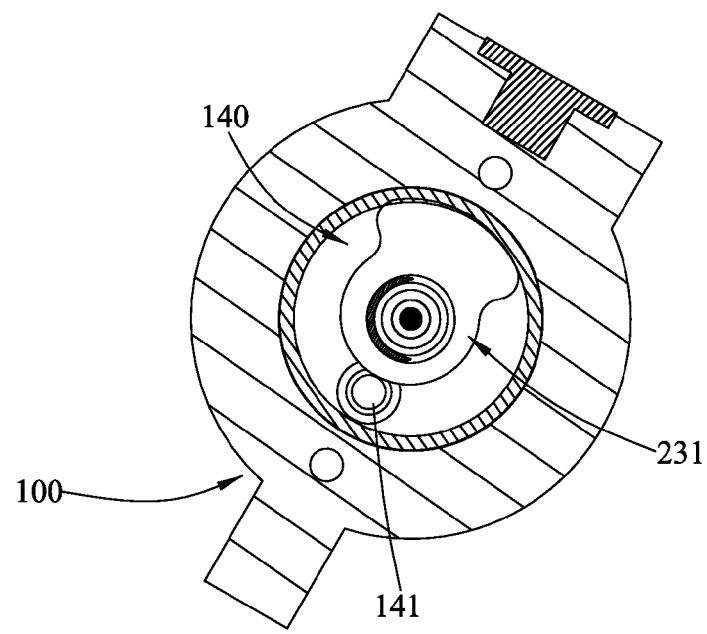
FIG. 8 illustrates the structure of the switch plate rotating relatively to the water diversion body of the first embodiment when the water flows out of one of the two water outlets.

Refer to the FIG. 1 to the FIG. 8 of a flow adjustable waterway switch device of the first embodiment of the present embodiment.

Figure 4:
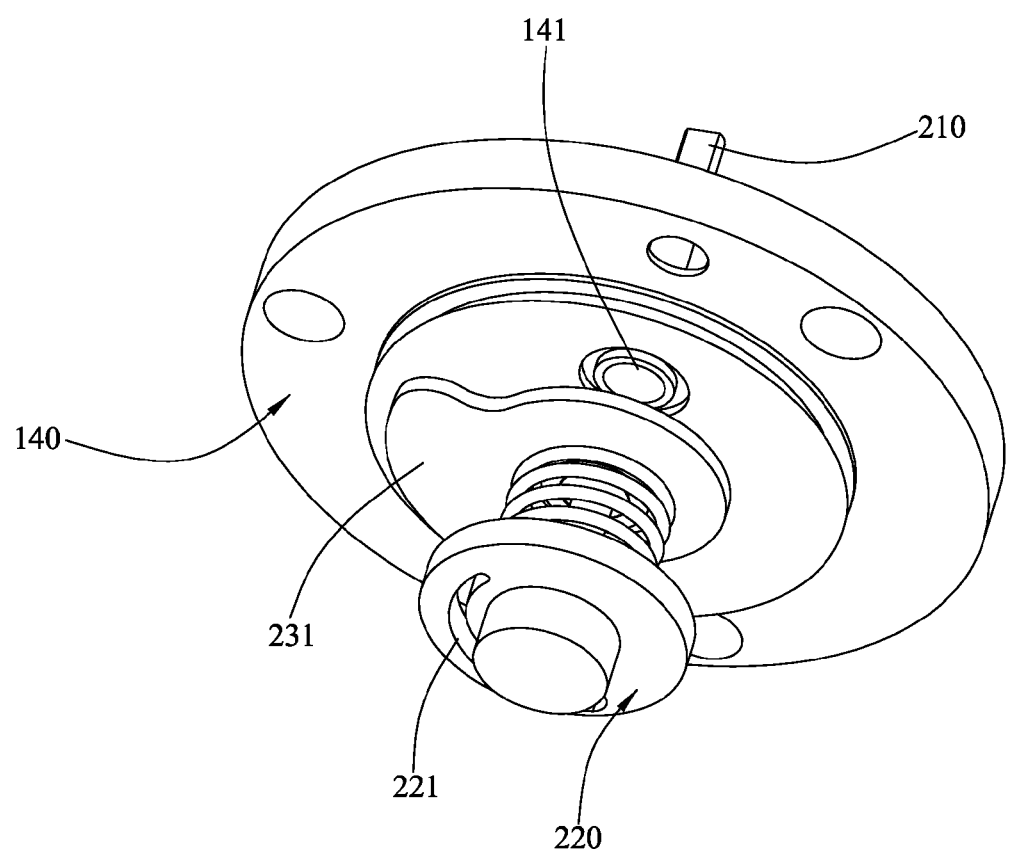
FIG. 4 illustrates the structure of the assembly of the driving shaft, the water diversion body, the switch plate, the switch rotor and the setting plate, when the switch plate is not sealed up the two water diversion holes of the first embodiment.

Combining the FIG. 1 to the FIG. 4, the device is assembled inside a valve body 100 to form an outlet mechanism, thereinto:

The valve body 100 is disposed with an inlet 110 connected to the water source and two independent outlets 120, 130; a water diversion body 140 is fixed inside the valve body 100, the end faces of the water diversion body 140 are separately disposed with a first water diversion hole 141 and a second water diversion hole 142, the first water diversion hole 141 is correspondingly connected to the first outlet 120, the second water diversion hole 142 is correspondingly connected to the second outlet 130.

A baffle 150 is fixed inside the valve body 100 and below the water diversion body 140. The baffle 150 is separated the interior cavity of the valve body 100 into a first cavity 160 and a second cavity 170. The first cavity 160 is disposed downward, the water flows through the inlet hole 111 of the inlet 110 to the first cavity 160, the baffle 150 is disposed with two water holes 151, 152, the first cavity 160 is connected to the second cavity 170 through the water holes 151, 152.

The device includes a driving shaft 210, a setting plate 220 and a button mechanism 230 (a mechanism similar to an automatic ball point pen), thereinto:

The setting plate 220 is rotated inside the valve body 100 and below the baffle 150. the setting plate 220 is disposed with an assembly groove 221 and a setting hole 222 of arc shape; one end of the driving shaft 210 is fixed to the interior end face of the control button 234, while the other end is sliding and connected inside the assembly groove 221 to form a relatively sliding connection with the setting plate 220 but not a relative rotation connection. By rotating the control button 234, the driving shaft 210 drives the setting plate 220 rotate relatively to the baffle 150. As the setting plate 220 is cooperated to the end face of the baffle 150, the setting hole 222 of the setting plate 220 is cooperated to the two water holes 151, 152 of the baffle 150. By changing the flow area of the two water holes 151, 152, the flow rate of the water from the first cavity 160 into the second cavity 170 changes, then the flow rate of the outlet water is adjusted.

The button mechanism 230 mainly includes a switch plate 231, a switch rotor 232, a restoring spring 233 and a control button 234. The driving shaft 210 is rotated relatively to the switch rotor 232 but not sliding relatively, the switch rotor 232 and the switch plate 231 are cooperated by the ratchet 2321 and the ratchet wheel 2311. The switch rotor 232 drives the switch plate 231 rotate forward, the switch plate 231 is cooperated with the end face of the water diversion body 140. in this embodiment, as the rotating angle is 90 degrees and the angle between the first water diversion hole 141 and the second water diversion hole 142 is 180 degrees, every time the switch plate 231 rotates forward, it will seal off one of the first and second water diversion hole 141, 142 or it will be situated between the two water diversion holes to make the two water transferring; the restoring spring 233 is sleeved with the driving shaft 210, a control button 234 is covered on the driving shaft 210 and extended out of the valve body 100 for the user's operation, the restoring spring 233 is withstood between the interior end face of the control button 234 and the water diversion body 140 to control the control button 234 repositioned; two limiting sleeves 235, 236 are separately sleeved with the driving shaft 210.

The first embodiment is further fixed with a plug 400 in one end of the valve body 100 to handle a shower or others.

Figure 5:
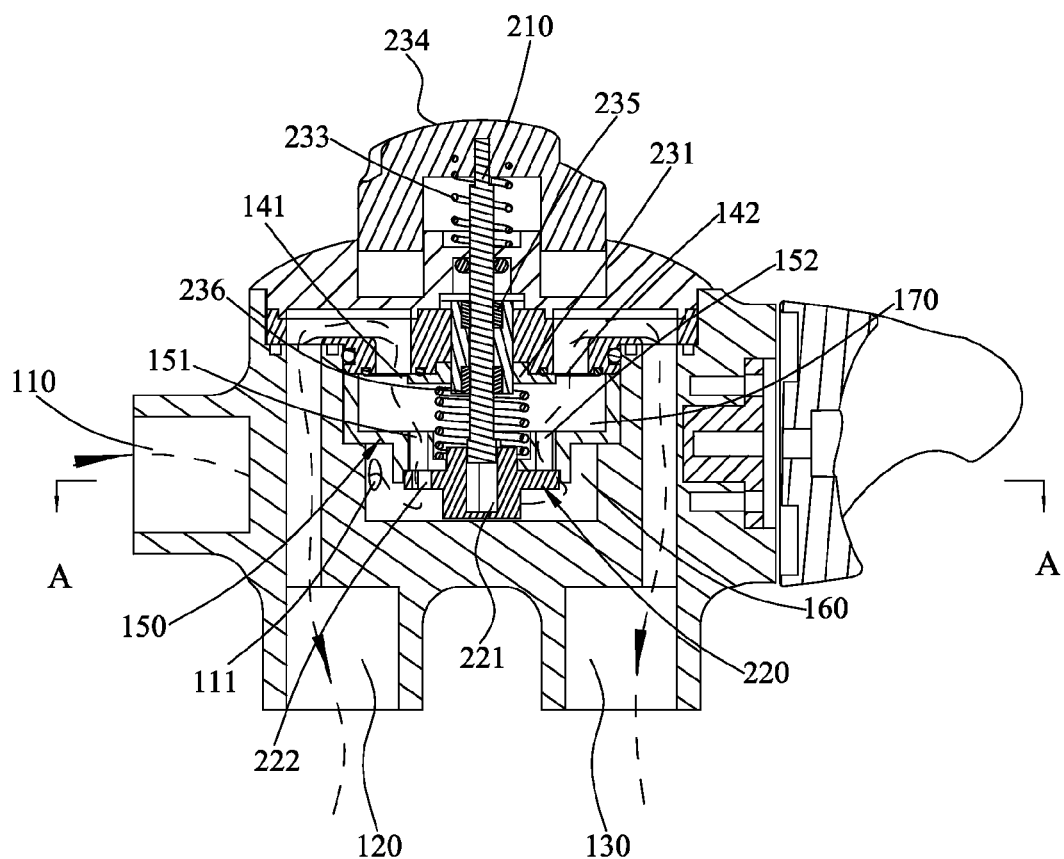
FIG. 5 illustrates the sectional view of the valve body with two outlets water outlet of the first embodiment.
Figure 6:
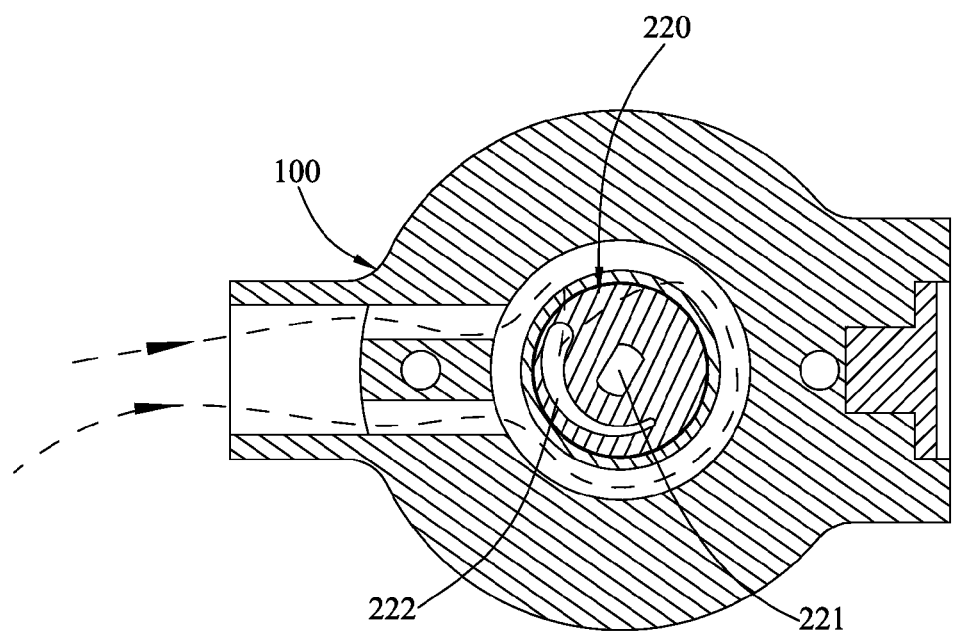
FIG. 6 illustrates the sectional view of the A-A of the FIG. 5.

The working principle of the device combined with the valve body 100 is figured out in the FIG. 5 to FIG. 8:

To adjust the outlet flow, as figured in the FIG. 5 and FIG. 6, the user rotates the control button 234, the driving shaft 210 will drive the setting plate 220 rotate, after the water flows into the inlet 110 then into the first cavity 160 through the inlet hole 111, the flow area of the setting hole 222 and the two water hole 151, 152 of the baffle 150 changes with the rotation of the setting plate 220. So the flow rate of the water from the first cavity 160 into the second cavity 170 changes to adjust the outlet flow.

Figure 7:
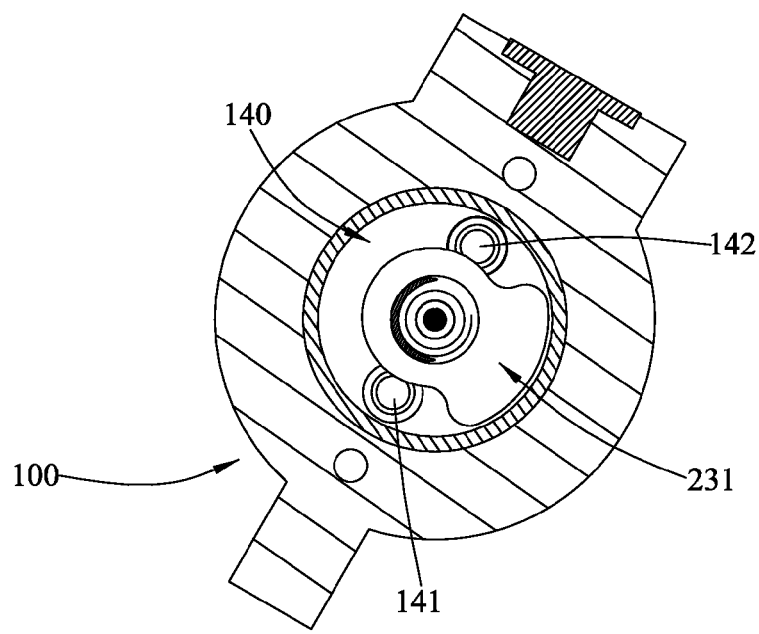
FIG. 7 illustrates the structure of the switch plate rotating relatively to the water diversion body of the first embodiment when the water flows out of the two water outlets.

As figured in the FIG. 4, FIG. 5 and FIG. 7, if the switch plate 231 is situated in the between the two water diversion holes 141, 142 in the initial status, the two water diversion holes 141, 142 are not sealed up by the switch plate 231 and connected to the second cavity 170, the water flows out of the two outlets 120, 130.

To switch the outlets, as figured in the FIG. 8, press the control button 234 to make the driving shaft 210 drive the switch plate 231 to rotate forward, as the rotation angle of the switch plate 231 is 90 degrees, the switch plate 231 is just sealed the second water diversion hole 142 up and the first water diversion hole 141 is connected to the second cavity 170, making the water flows out of the first outlet 120 but not the second outlet 130.

Press the control button 234 again, with the rotation of the switch plate 231, the water flows out of the second outlet 130 but not the first outlet 120, by repeating, the outlets of the outlet mechanism are controlled and switched.

Figure 9:
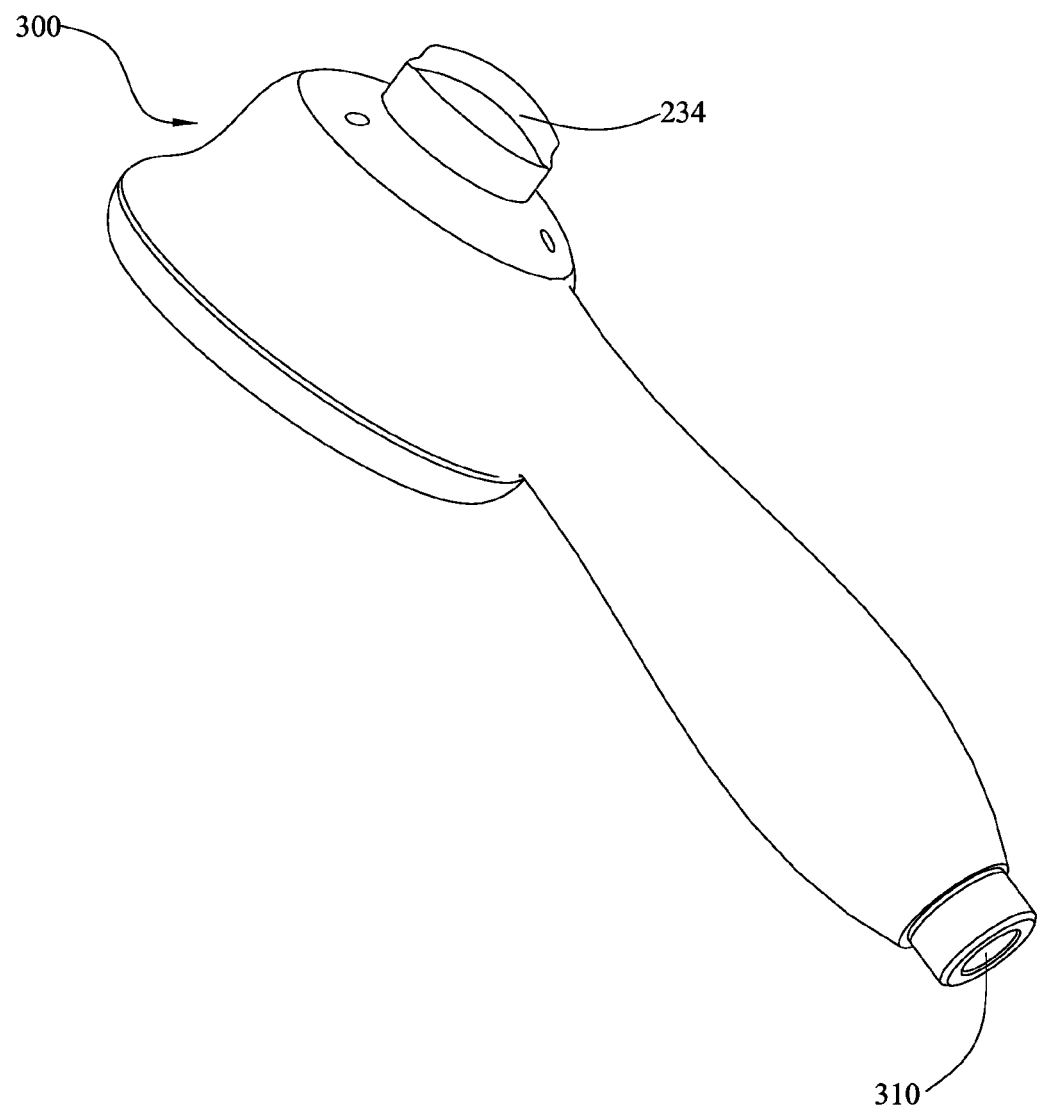
FIG. 9 illustrates the structure of the waterway switch device combined with a shower of the second embodiment.
Figure 10:
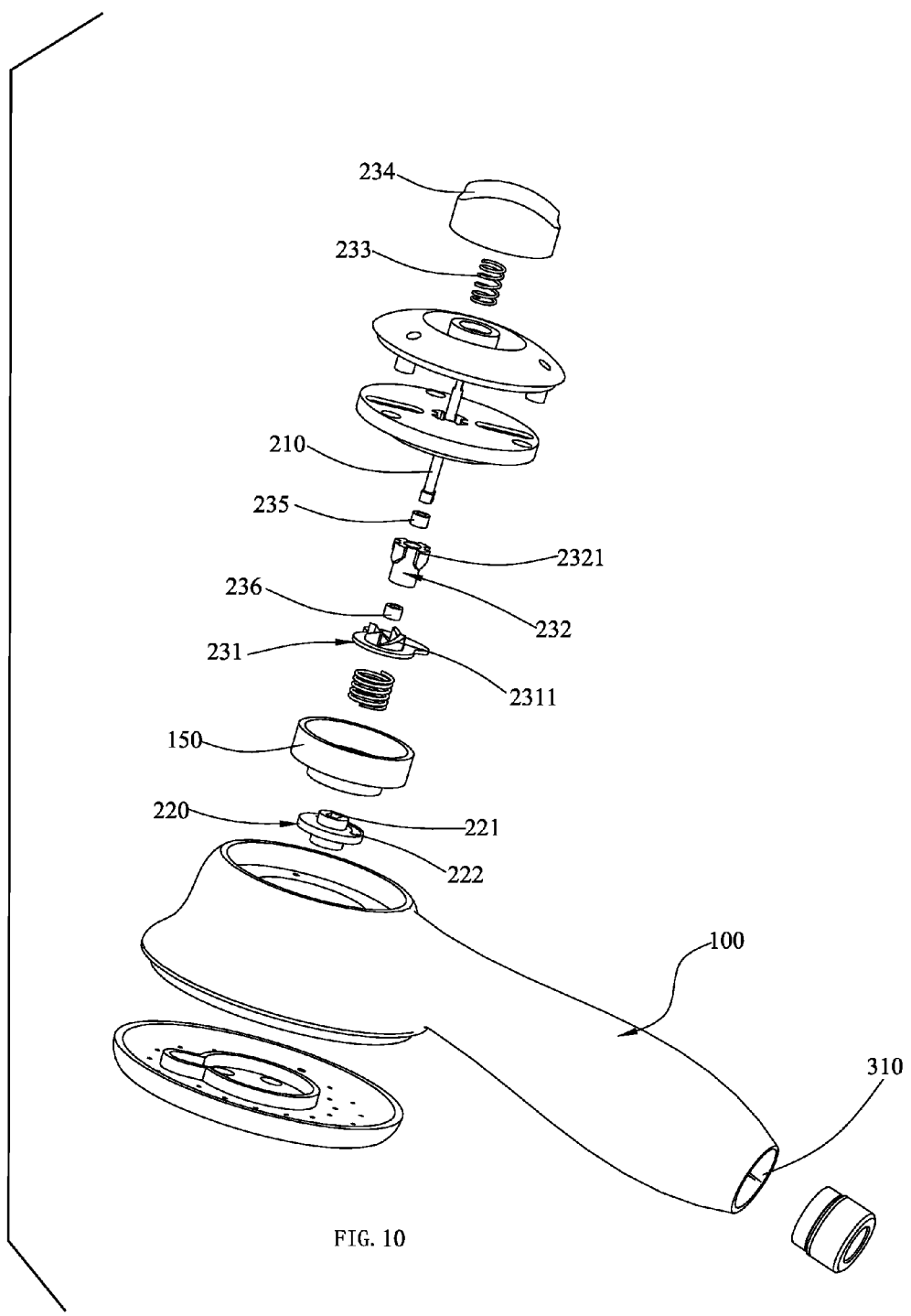
FIG. 10 illustrates the breakdown structure of the waterway switch device combined with a shower of the second embodiment.
Figure 11:
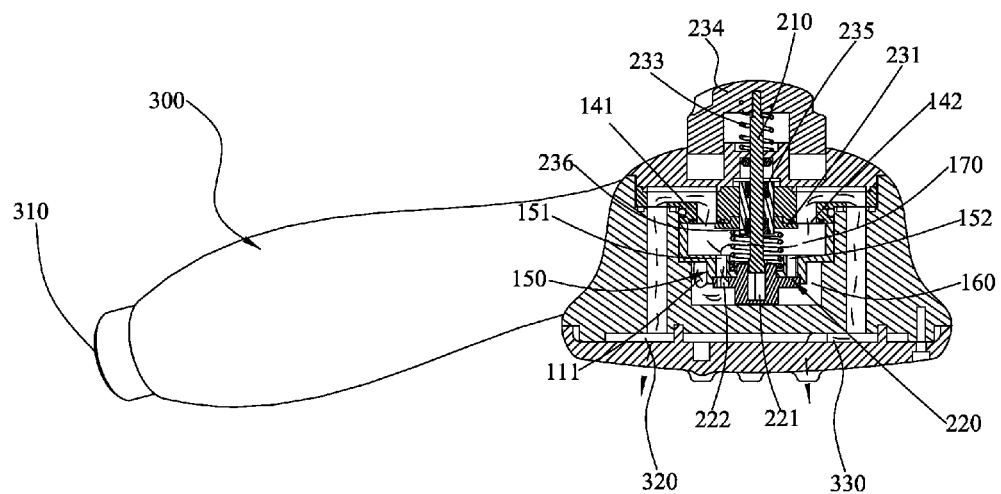
FIG. 11 illustrates the sectional view of the shower of the second embodiment when the water flows out of the two outlets.

FIG. 9, FIG. 10 and FIG. 11 illustrate the second embodiment of the present invention, different from the first embodiment, the device is combined with a shower and disposed inside the shower, the shower body 300 includes an inlet 310 connected to the water source and two independent outlets 320, 330, the structure and working principle of the flow adjustable waterway switch device are similar to the first embodiment.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention of a flow adjustable waterway switch device is disposed inside a valve body or a shower body, the driving shaft drives the setting plate rotate to adjust the flow rate, with the cooperation of the driving shaft and the button mechanism, the outlets are switched, the structure is compact with complete functions.

What is claimed is:

1. A flow adjustable waterway switch device disposed inside a valve body, the valve body being disposed with an inlet connected to a water source and at least two outlets, the waterway switch device comprising:
    a driving shaft, one end of the driving shaft being disposed outside the valve body, an other end of the driving shaft being disposed inside the valve body;
    a setting plate capable of being rotated and disposed inside the valve body, the driving shaft being capable of sliding and connected to the setting plate but not capable of being relatively rotated, the setting plate capable of being driven to rotate by rotation of the driving shaft, a flow area of the inlet is changed by a relative rotation of the setting plate and the valve body to adjust a flow; and
    a button mechanism including
        a switch plate capable of being rotated and disposed inside the valve body,
        a switch rotor, and
        a restoring spring,
        the driving shaft being rotated relatively to the switch rotor but not sliding relatively,
        the switch plate being driven to rotate forward by repeatedly sliding the switch rotor, and
        switching of the outlets to connect to the inlet is realized by relatively rotating the switch plate and the valve body.

2. A flow adjustable waterway switch device according to claim 1, wherein the valve body includes a water diversion body, an end face of the water diversion body is disposed with at least two water diversion holes separately corresponding to the outlets,
    the switch plate and the switch rotor are capable of being synchronously rotated relative to the end face of the water diversion body.

3. A flow adjustable waterway switch device according to claim 1, wherein the flow adjustable waterway switch device further comprises:
    a ratchet wheel; and
    a ratchet,
    wherein the switch plate and the switch rotor are cooperated by the ratchet wheel and the ratchet.

4. A flow adjustable waterway switch device according to claim 1, wherein the valve body includes a water diversion body, wherein
    the button mechanism further includes a control button, the control button is extended out of the valve body,
    the driving shaft is sleeved inside the restoring spring,
    the restoring spring is withstood between the control button and the water diversion body.

5. A flow adjustable waterway switch device according to claim 1, wherein
    the setting plate is disposed with an assembly groove,
    the button mechanism further includes a control button,
    the one end of the driving shaft being fixed to an interior end face of the control button, the other end of the driving shaft being capable of sliding and connected to an inside of the assembly groove.

6. A flow adjustable waterway switch device according to claim 1, wherein the valve body is fixed with a baffle inside, the baffle separates a cavity of the valve body into two cavities, at least one water hole is disposed within the baffle.

7. A flow adjustable waterway switch device according to claim 6, wherein the setting plate is capable of being rotated relative to the baffle, the setting plate is disposed with a setting hole corresponding to an end face of the at least one water hole.

8. A flow adjustable waterway switch device disposed inside a shower body, the shower body being disposed with an inlet connected to a water source and at least two outlets, waterway switch device comprising:
    a driving shaft, one end of the driving shaft being disposed outside the shower, body, an other end of the driving shaft being disposed inside the shower body,
    a setting plate capable of being rotated and disposed inside the shower body, the driving shaft being capable of sliding and connected to the setting plate but not capable of being relatively rotated, the setting plate capable of being driven to rotate by rotation of the driving shaft, a flow area of the inlet is changed by a relative rotation of the setting plate and the shower body to adjust a flow; and a button mechanism including a switch plate capable of rotation and disposed inside the shower body, a switch rotor, and a restoring spring, the driving shaft being rotated relatively to the switch rotor but not sliding relatively, the switch plate being driven to rotate forward by repeatedly sliding the switch rotor, and switching of the outlets to connect to the inlet is realized by relative rotation of the switch plate and the shower body.

9. A flow adjustable waterway switch device according to claim 8, wherein the shower body includes a water diversion body, an end face of the water diversion body is disposed with at least two water diversion holes separately corresponding to the outlets, further wherein the flow adjustable waterway switch device further comprises:

a ratchet wheel; and a ratchet, the switch plate and the switch rotor are capable of being synchronously rotated relatively to the end face of the water diversion body, the switch plate and the switch rotor are cooperated by the ratchet wheel and the ratchet.

10. A flow adjustable waterway switch device according to claim 8, wherein wherein the shower body includes a water diversion body the button mechanism further includes a control button, the control button is extended out of the shower body, the driving shaft is sleeved inside the restoring spring, the restoring spring is withstood between the control button and the water diversion body.

11. A flow adjustable waterway switch device according to claim 5, wherein the valve body is fixed with a baffle inside, the baffle separates a cavity of the valve body into two cavities, at least one water hole is disposed within the baffle.

* * * * *